US005550739A

United States Patent [19]
Hoffmann et al.

[11] Patent Number: 5,550,739
[45] Date of Patent: Aug. 27, 1996

[54] SEMI-ACTIVE SUSPENSION CONTROL SYSTEM

[75] Inventors: Michael Hoffmann, Frankfurt am Main; Alfred Eckert, Mainz-Laubenheim, both of Germany

[73] Assignee: Alfred Teves GmbH, Frankfurt, Germany

[21] Appl. No.: 401,337

[22] Filed: Mar. 9, 1995

Related U.S. Application Data

[63] Continuation of Ser. No. 50,444, Jun. 30, 1993, abandoned.

[30] Foreign Application Priority Data

Oct. 26, 1990 [DE] Germany .................. 40 36 064.4

[51] Int. Cl.⁶ .................................................. G06F 19/00
[52] U.S. Cl. ........................... 364/424.05; 280/707
[58] Field of Search ................... 364/424.05, 508, 364/572; 280/707

[56] References Cited

U.S. PATENT DOCUMENTS 5,024,302 6/1991 Karnopp .................................. 188/299
5,034,890 7/1991 Sugasawa et al. ................. 364/424.05

FOREIGN PATENT DOCUMENTS 0027869  5/1981  European Pat. Off. .
0032158  7/1981  European Pat. Off. .
0265670  5/1988  European Pat. Off. .
0341883  11/1989 European Pat. Off. .

OTHER PUBLICATIONS

Hedrick et al., "Invariant Properties of Automotive Suspensions", International Conference on Advanced Suspensions, 24–25 Oct., 1988, The Institution of Mechanical Engineers, Birdcage Walk, London (GB), pp. 35–42.
Karl Brammer, Gerhard Siffling, "Kalman–Bucy–Filter", *Methods of Control Technology*, 1975, pp. 75–83.

Primary Examiner—Collin W. Park
Assistant Examiner—Leigh Marie Garbowski
Attorney, Agent, or Firm—Ratner & Prestia

[57] ABSTRACT

A semi-active suspension control system comprises exclusively chassis acceleration sensors ($S_1$ to $S_3$) as sensors (1) for obtaining the information for the damping force control. The output signals of these sensors are analyzed in a filter (3), the transmission behavior of which is in linear approximation to the transmission behavior of a discrete Kalman filter, when concentrating on the frequency range between the natural chassis frequency and the natural wheel frequency.

10 Claims, 4 Drawing Sheets

SEMI-ACTIVE SUSPENSION CONTROL SYSTEM

This application is a continuation of application Ser. No. 08/050,444 filed Jun. 30,1993, now abandoned.

BACKGROUND OF THE INVENTION

The present invention relates to a semi-active suspension control system for automotive vehicles which is substantially composed of controllable vibration dampers, sensors for obtaining the information about the chassis performance required for the control, and electronic circuits for assessing the sensor signals and for generating damper-actuating signals.

The absolute chassis velocity is the predominant control variable for the assessment of comfort in respect of a semi-active suspension control system. The magnitude of the damping force which is required for great driving safety and major control comfort is responsive to the chassis velocity. However, this control variable is not developed as a direct measurement. It is common to measure the chassis acceleration and to calculate the chassis velocity by integration of these measured variables.

In addition, the damper speed is required to produce a semi-active suspension control. The damper speed is determined by measurement of the damper travel, that is the relative travel between wheel and chassis, and by differentiation of this value or by integration of the wheel acceleration which can be measured by means of acceleration transducers. There are a number of known difficulties and problems associated with the assessment of the various sensor signals and such integration and differentiation.

European patent application EP-A-0 341 883 teaches an analog-digital method and a corresponding device for determining by approximation the absolute chassis speed for an active or semi-active suspension control system. In this method, the output signal of a chassis-acceleration sensor is assessed for the control algorithm by way of an analog integrator which also contains a low-pass filter of first order. Digital filters are used for separating the constant-frequency and the low-frequency components. Further, the control system comprises relative-speed sensors, the output signals of which are assessed for switching on and off the damper force which is generated by variable vibration dampers. A semi-active control system of this known type necessitates sensors both for determining the absolute chassis acceleration and for determining the relative movement between chassis and wheel. Considerable expenditure is involved.

Also, EP-A-0 341 883 mentions a so-called Kalman filter. To be precise, this system, which has been described by Karl Brammer and Gerhard Siffling in the text-book "Kalman-Bucy-Filter" in the series Methods of Control Technology by the R. Oldenbourg publishing house Munich (Germany), Vienna (Austria), 1975, on pages 75 to 83 and which is referred to as "filter," is a deterministic observer which starts from the mathematic description of the real system and corrects the (model) variables or variables of state which are determined and being measurable not at all or only by entailing great effort to form estimated quantities by virtue of a value which takes into consideration the stochastic properties of system malfunctions or measurement errors, the estimated quantities being obtained by filtering of the difference between measurable output quantities of the real system and the calculated output quantities of the model. However, the application of such filters in real systems requires a great calculating capacity so that they do not appear to be suited for use in suspension control systems of vehicles in view of the required expenditure.

Further, so-called ¼ vehicle models and full car models which mathematically describe the physical behavior of wheels and chassis of an automotive vehicle are e.g. known from "Proceedings of the Institution of Mechanical Engineers" International Conference on Advanced Suspensions, 24 to 25 Oct. 1988; The Institution of Mechanical Engineers, Birdcage Walk, London (Great Britain), pages 35 to 42.

SUMMARY OF THE INVENTION

Therefore, it is an object of this invention to manage with the minimum possible number of sensors for avoiding or minimizing these difficulties and for reducing the expenditure in manufacture.

This object is achieved according to this invention by only providing chassis acceleration sensors as sensors to obtain the information required for the damping force control. The output signals of these sensors are supplied to a filter whose transmission behavior is in linear approximation with the transmission behavior of a filter which covers the entire frequency spectrum occurring, e.g. a discrete Kalman filter. The output signals of the filter, which correspond to the (actual) damper speed or a signal representative of the damper speed, are assessed for determining the damper-actuating signals. The transmission behavior of the filter is calculated on the basis of a vehicle model and by concentrating on a frequency range, the bottom limit of which corresponds approximately to the 0.1-fold up to the 0.5-fold of the natural chassis frequency, while its top limit corresponds approximately to the 1.2-fold up to the 2-fold of the natural wheel frequency.

A range between approximately 0.2 and 20 hertz, more particularly between 0.5 and 16 hertz, has proven to be expedient in this respect.

By "concentrating" on the indicating frequency range, the transmission behavior of this simplified filter, especially within this range, can be approximated to the transmission behavior of a Kalman filter.

According to an advantageous embodiment of this invention, the transmission behavior of the filter is set by calculating a Kalman filter for ¼ vehicle type and by adapting to a predetermined road pattern or, respectively, disturbance pattern. A like ¼ vehicle model can be described by a simple mathematic equation system which characterizes the vehicle behavior sufficiently precisely for many cases.

Although the chassis acceleration and, respectively, chassis velocity on each wheel must be known for the suspension control, three chassis acceleration sensors, one arranged on each vehicle corner, are sufficient because the chassis acceleration on the fourth vehicle corner can be calculated from the measured variables.

Thus, the cost required for this semi-active suspension control system, in comparison to known systems of this type which require chassis acceleration sensors and damper travel sensors, is reduced considerably by being limited to chassis acceleration sensors. In addition, the control quality is enhanced by avoiding the difficulties involved in the analysis of the data of a large number of sensors.

Further features, advantages and possibilities of application of this invention can be taken from the following description of additional details and from the accompanying drawings.

DETAILED DESCRIPTION OF THE INVENTION

Figure 1:
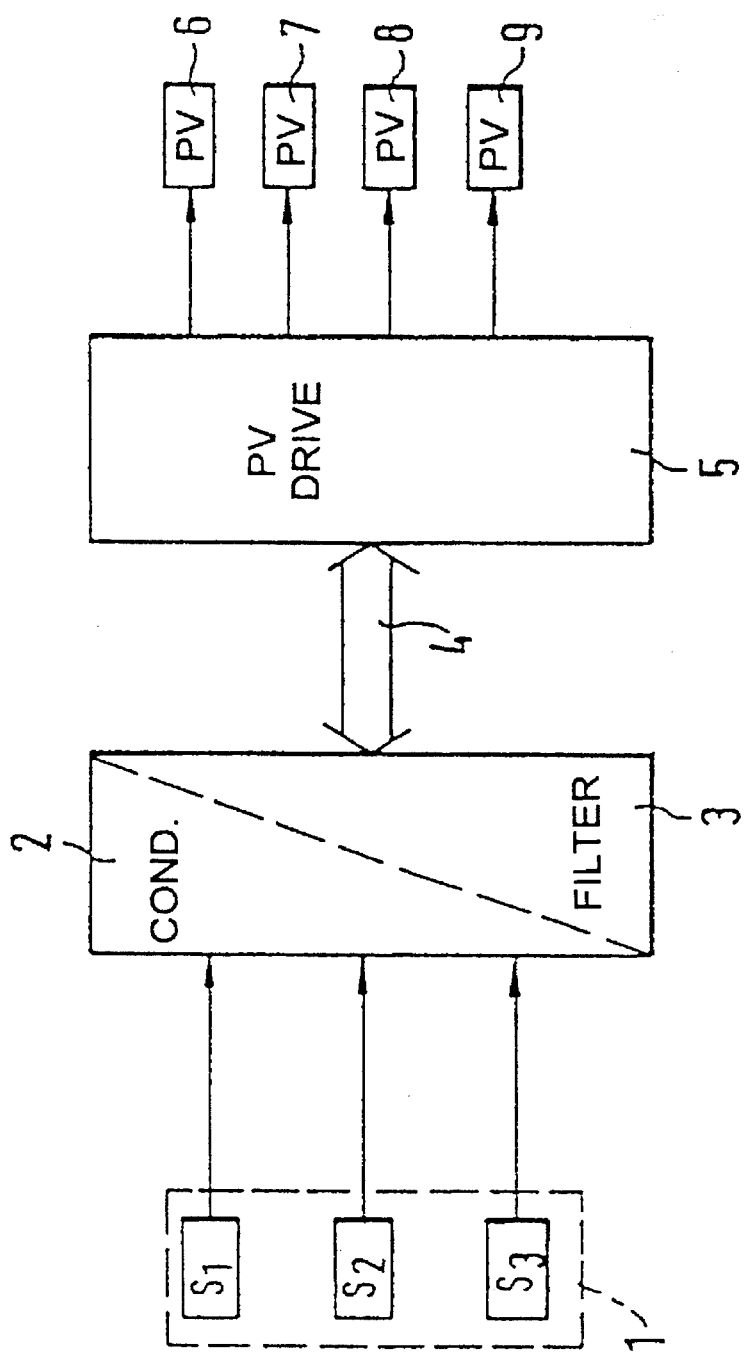
FIG. 1 is a block diagram of the essential component parts of a suspension control system according to this invention.

It can be seen from FIG. 1 that the suspension control system according to the invention is substantially composed of three chassis acceleration sensors $S_1$, $S_2$, $S_3$, designated as a whole by reference numeral 1, electronic circuits 2 to 5 and proportional valves 6, 7, 8, 9 (identified in FIG. 1 by the legend PV) serving to adjust the damper force.

In the first electronic circuit 2, 3 which is supplied with the sensor signals $S_1$, $S_2$, $S_3$, the chassis acceleration and the chassis velocity on the four corners of the automotive vehicle are determined. Reference numeral 2 represents the first electronic circuit (identified in FIG. 1 by the legend COND.) where the sensor signals are conditioned and where the "behavior" of the chassis on all four vehicle corners is determined. The damper-actuating signals are determined in the second electronic circuit 5 (identified in FIG. 1 by the legend PV DRIVE) by analysis of information supplied by the sensors $S_1$ to $S_3$, and they are delivered to the valves 6 to 9.

The first circuit 2, 3 comprises also those filters 3 (identified in FIG. 1 by the legend FILTER) which serve to derive from the sensor signals the actual damper speed and, respectively, a signal representative of the damper speed.

An essential feature of the present invention is the design of the filter 3. As is known, a Kalman filter or any other filter covering the entire occurring frequency spectrum offers the most comprehensive possibility of computing the necessary variables of state of the signals as supplied by the sensors $S_1$ to $S_3$. Yet such filters have the known shortcoming of entailing a very great computing expenditure and long computing times. Therefore, according to the present invention, the filter characteristics of a discrete Kalman filter are approximated with a transmission structure which is much simpler in respect of computation without the basic properties of the filter being lost. For this purpose, a Kalman filter is computed for a linearized ¼ vehicle type and is adapted to a given road and disturbance pattern, respectively. For the continuous transmission function H(s) of a like filter, the relation:

$$H(s) = \frac{-T_D s}{(1+T_1 s)(1+T_2 s)}$$

with $T_D \approx M_b/c_F$ $T_1$=(any number 2 through 5)×(½)×$\pi$×$f_A$.

$T_2$=(any number 0.5 through 0.8)×(½)×$\pi$×$f_R$.

applies, where:

$M_b$=mass of the vehicle chassis $c_F$=spring rate of the wheel suspension s=Laplace operator $f_A$=natural chassis frequency $f_R$=natural wheel frequency The corresponding discrete transmission function H ($z^{-1}$) reads:

$$H(z^{-1}) = \frac{-T_D}{T_1 - T_2} (\lambda_1 - \lambda_2) \frac{1 - z^{-1}}{1 - (\lambda_1 + \lambda_2)z^{-1} + \lambda_1 \lambda_2 z^{-2}}$$

with $\lambda_1 = e^{-T_o/T_1}$ $\lambda_2 = e^{-T_o/T_2}$ $T_o$=scanning time $T_D \approx M_b/c_F$ z=operator of the discrete transmission function.

This implies for the computation algorithm:

$$V_D(k)=(\lambda_1+\lambda_2)V_D(k-1)-\lambda_1\lambda_2 V_D(k-2)-M(a_B(k)-a_B(k-1))$$

with $$M = \frac{T_D}{T_1 - T_2} (\lambda_1 - \lambda_2)$$

That is to say, according to the present invention, the filter is determined by a linear approximation to a filter covering the entire occurring frequency spectrum, such as a Kalman filter, while a concentration on the useful frequency range, namely on the frequency range between the natural chassis frequency and the natural wheel frequency is performed. A transmission structure is chosen which, compared to a Kalman filter, is considerably simpler in respect of computation. This minimizes considerably the necessary arithmetic input in comparison to a Kalman filter. A signal is obtained, nevertheless, which represents the chassis velocity sufficiently exactly for a suspension control system. Disturbance pulses are suppressed. The signal can be processed comparatively easily by microcomputer programs.

When determining the transmission function of the inventive filter, special importance is attributed to a frequency range which commences somewhat below the natural chassis frequency and extends roughly up to the 1.2-fold or twofold of the natural wheel frequency. This concentration can be effected e.g. in respect of a frequency range of 0.5 up to 16 hertz.

In contrast to a Kalman filter, the inventive filter 3 does not transmit slow drift influences because a bottom limit frequency is predefined. The filter does not have offset problems and suppresses disturbances of higher frequency. The number of the necessary computing operations for assessing the signal is relatively small so that any conventional microcomputer with a fixed point arithmetic can compute the algorithms. The "error in estimating", namely the error due to simplification of the transmission function, in contrast to a Kalman filter, is minute. Further, the inventive filter is not susceptible to fluctuations in parameters of the vehicle such as load, non-linearly variable damping etc.

As only the zero passage and, respectively, the sign of the damper speed is required for the semi-active suspension control, measuring errors due to wrong sensor positioning or due to similar effects are relatively small.

Figure 2:
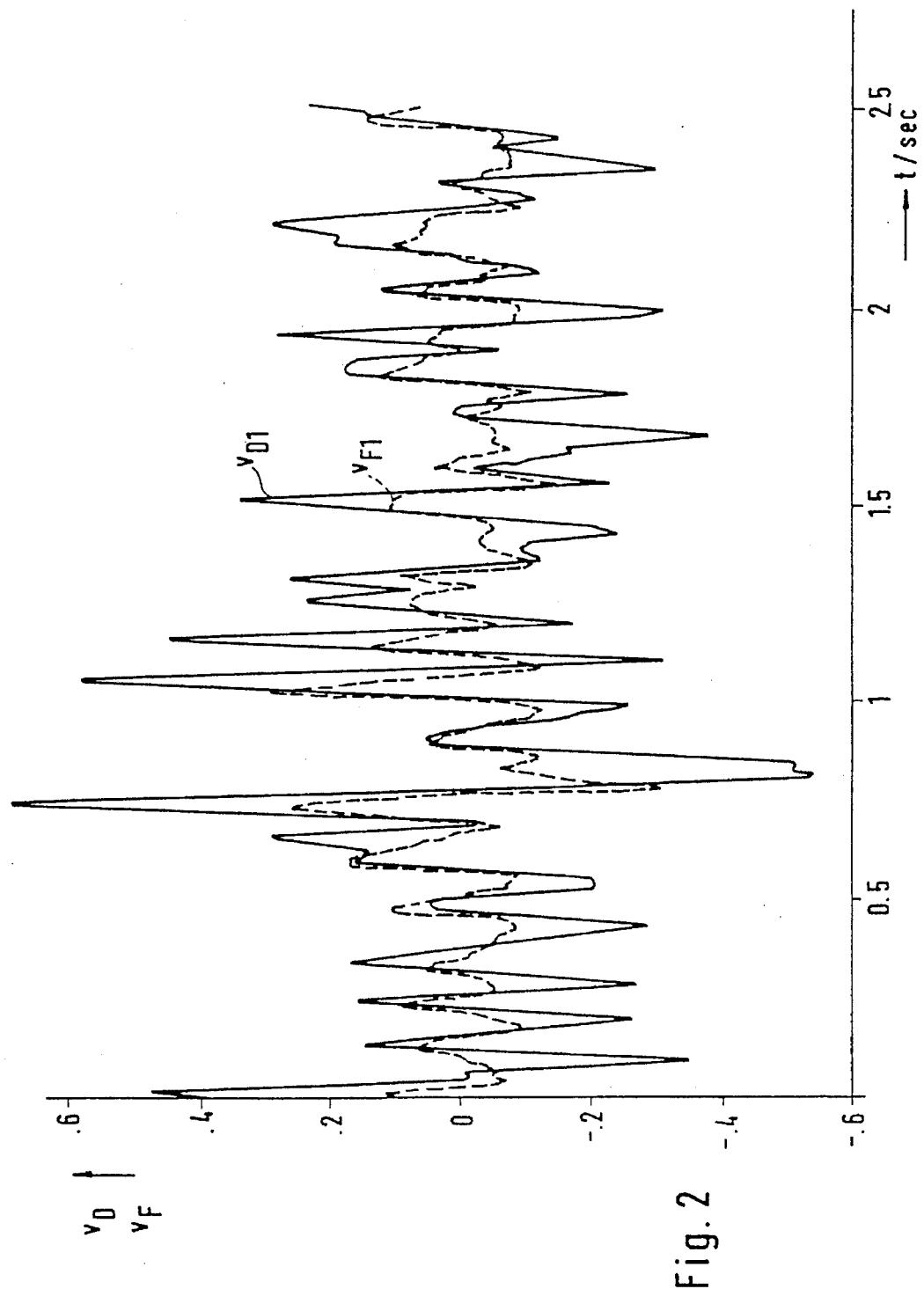
FIG. 2 is a diagram showing the damper speed in a damping action, namely the variation of the "genuine" damper speed in comparison to the "estimated" speed determined by way of a simulation model.
Figure 3:
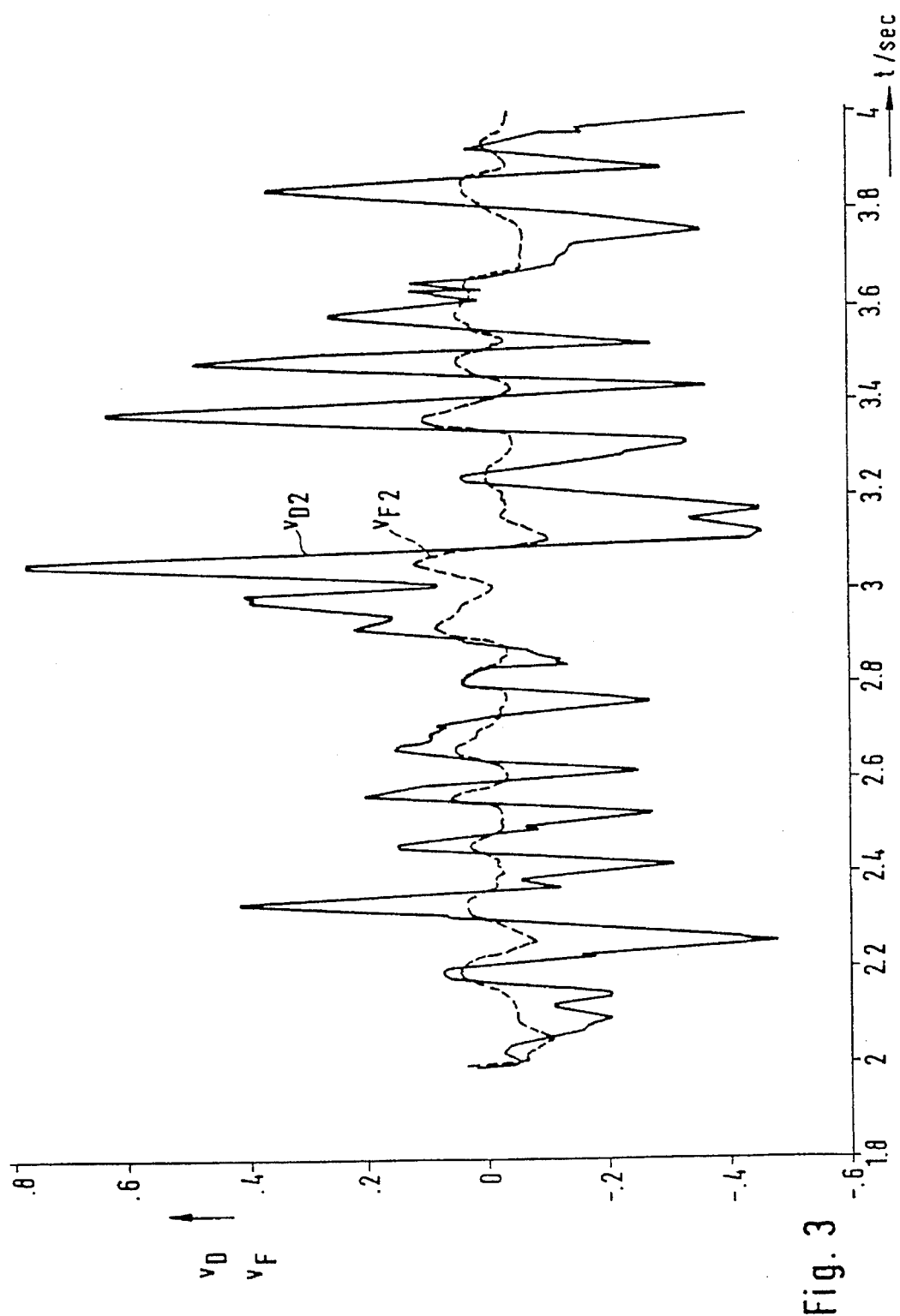
FIG. 3 is a diagram, like that in FIG. 2, of the same measured variables determined by way of a different vehicle type.
Figure 4:
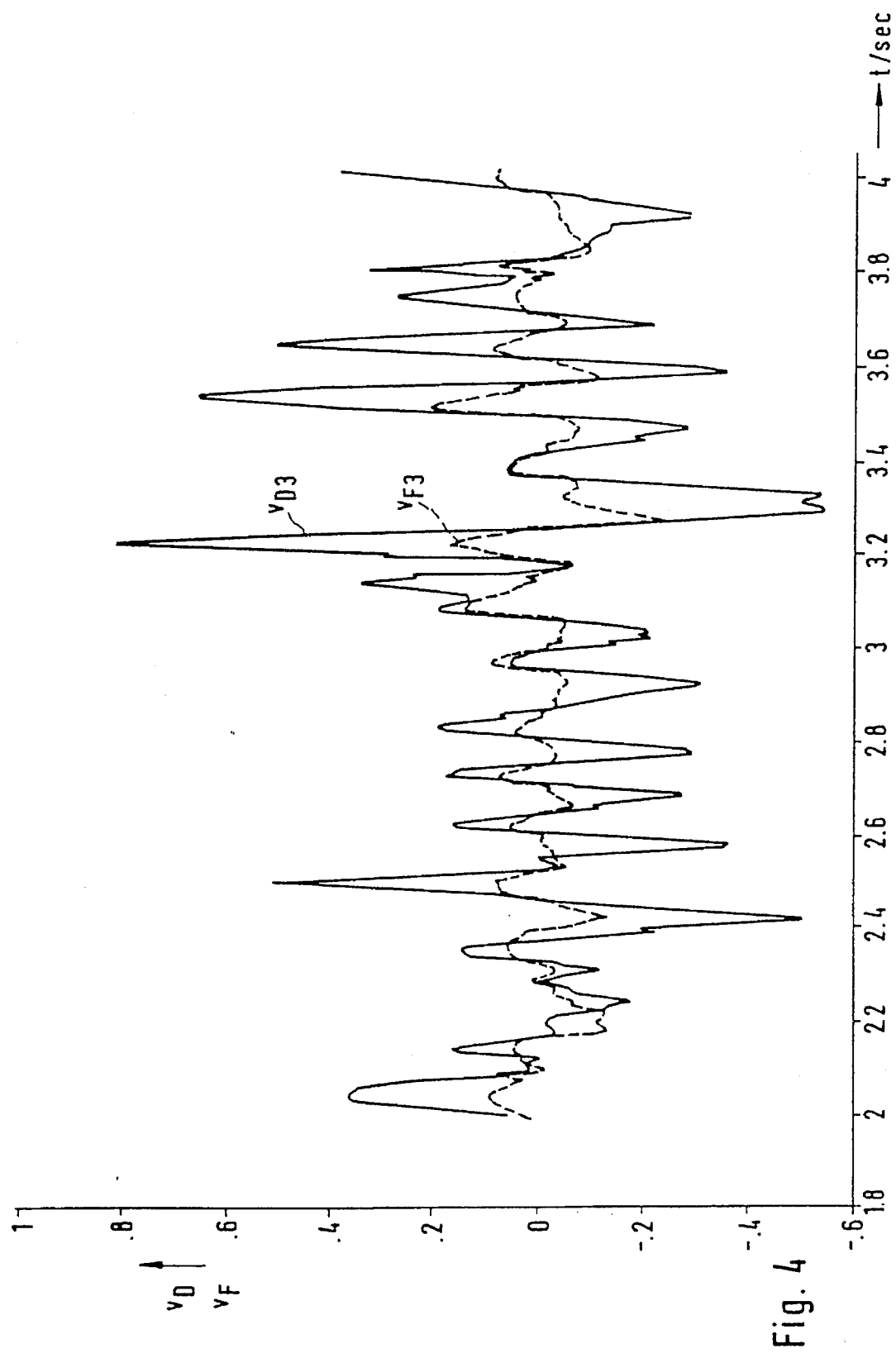
FIG. 4 is a diagram, like that in FIGS. 2 and 3, of the same measured variables determined in a driving test.

The curves of FIGS. 2 to 4 show the proper correspondence between the damper speed $v_F$ determined by the inventive filter 3 and the actual values $v_D$. The curves according to FIG. 2 and FIG. 3 are obtained by simulations. FIG. 2 relates to a simulation with a non-linear ¼ vehicle model. This model comprises a non-linear spring, a non-linear and proportionally adjustable damper and a high-precision suspension control system. The road is a standardized test road, a so-termed random road, which corresponds to a poor road surface. In FIG. 2, the variation of the "genuine" damper speed $v_{D1}$ compared to the "estimated" speed $v_{F1}$ obtained by means of the inventive filter is illustrated. The characteristic curve obtained with the inventive filter is shown in FIG. 2 on a different scale. As only zero passages are decisive in first line, there was no need for scaling. The conformity between the two signals $v_{D1}$ and $v_{F1}$ is apparent. The curve $V_{D1}$, obtained by way of the complete Kalman filter which ascertains the entire frequency range, shows almost the same course as the "estimated" signal $V_{F1}$ as regards the direction and the zero passages.

The representation of the damper speed $v_{D2}$ according to FIG. 3 was computed by means of a nonlinear complete vehicle model (ADAMS). This known model of much use is equipped with real axle kinematics, spring rigidities and measured spring and damper characteristic curves. In addition, proportionally adjustable dampers and a high-precision suspension control system are included. A very good conformity of the "genuine" signal variation $v_{D2}$ with the "estimated" signal variation $v_{F2}$ can be found in this embodiment also.

Finally, FIG. 4 illustrates the corresponding signal variations by measurement on a test vehicle. The signals again have been illustrated graphically on a different scale because practically only the zero passages and the direction of the signals are of significance. There is a similarly favorable concordance between the signal variations $v_{D3}$ and $V_{F3}$ like in FIGS. 2 and 3.

We claim:

1. A semi-active suspension control system for automotive vehicles, said system comprising:
 a plurality of chassis acceleration sensors for developing chassis acceleration signals representative of acceleration of an automotive vehicle chassis;
 a plurality of vibration dampers for controlling vibration of said automotive vehicle chassis;
 and electronic circuit means responsive only to said chassis acceleration signals for generating damper-actuating signals to actuate said vibration dampers, said electronic circuit means having:
  (a) a filter which:
   (i) produces output signals representative of the speed of said vibration dampers, and
   (ii) has a transmission characteristic which concentrates on a discrete frequency range having a lower limit approximately 0.1-fold to 0.5-fold of the natural vehicle chassis frequency and an upper limit approximately 1.2-fold to 2-fold of the natural vehicle wheel frequency, and (b) circuitry for assessing said output signals of said filter to develop said damper-actuating signals.

2. A suspension control system according to claim 1 wherein said transmission characteristic of said filter is concentrated in a range between 0.2 and 20 hertz.

3. A suspension control system according to claim 2 wherein said transmission characteristic of said filter is concentrated in a range between 0.5 and 16 hertz.

4. A suspension control system according to claim 3 wherein said transmission characteristic of said filter is set by calculating a Kalman filter for ¼ vehicle model and by adapting said Kalman filter for ¼ vehicle model to a predetermined road pattern.

5. A suspension control system according to claim 3 wherein said transmission characteristic of said filter is set by calculating a Kalman filter for ¼ vehicle model and by adapting said Kalman filter for ¼ vehicle model to a predetermined disturbance pattern.

6. A suspension control system according to claim 1 wherein said filter has a continuous transmission function H(s) defined by:

$$H(s) = \frac{-T_D s}{(1 + T_1 s)(1 + T_2 s)}$$

with $T_D = M_b/c_F$
 $T_1 = $ (any number 2 through 5)×(½)×π×$f_A$
 $T_2 = $ (any number 0.5 through 0.8)×(½)×π×$f_R$
 where:
  $M_b$ = mass of the vehicle chassis
  $c_F$ = spring rate of the wheel suspension
  s = Laplace operator
  $f_A$ = natural chassis frequency
  $f_R$ = natural wheel frequency.

7. A suspension control system according to claim 1 wherein said chassis acceleration sensors are positioned on at least three corners of said automotive vehicle.

8. A suspension control system according to claim 7 wherein said chassis acceleration sensors are positioned at three corners of said automotive vehicle and chassis acceleration at a fourth corner of said vehicle is calculated from said chassis acceleration signals representative of chassis acceleration at said three corners of said automotive vehicle.

9. A suspension control system according to claim 1 wherein said transmission characteristic of said filter is in linear approximation with a transmission characteristic of a filter which covers the entire frequency spectrum.

10. A suspension control system according to claim 9 wherein said filter which covers the entire frequency spectrum is a Kalman filter.

* * * * *

UNITED STATES PATENT AND TRADE MARK OFFICE
CERTIFICATE OF CORRECTION

PATENT NO. : 5,550,739
DATED : August 27, 1996
INVENTOR(S) : Hoffmann et al.

It is certified that error appears in the above-identified patent and that said Letters Patent is hereby corrected as shown below:

At column 3, line 64, delete "$T_1$=(any number 2 through 5)X)½)X$\pi$X$f_A$", and insert --$T_1$=(any number 2 through 5)X(½)X$\pi$X$f_A$--.

At column 4, line 24, after

"$$M = \frac{T_D}{T_1 - T_2}(\lambda_1 - \lambda_2)$$"

insert

--$V_D$=damper speed
$a_B$=chassis acceleration--

At column 6, line 26, delete "with $T_D \equiv M_b / c_F$", and insert --with $T_D = M_b / c_F$--.

At column 6, line 31, "$M_b$=mass of the vehicle chassis" should not be indented.

Signed and Sealed this

Fourth Day of February, 1997

Attest:

BRUCE LEHMAN

*Attesting Officer*  Commissioner of Patents and Trademarks